US008824014B1

(12) United States Patent
Robinson et al.

(10) Patent No.: US 8,824,014 B1
(45) Date of Patent: Sep. 2, 2014

(54) SYSTEM AND METHOD FOR ADJUSTMENT OF COVERAGE PARAMETERS FOR DIFFERENT COLORS IN IMAGE DATA

(71) Applicant: Xerox Corporation, Norwalk, CT (US)

(72) Inventors: David Robinson, Penfield, NY (US); Katherine Loj, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 48 days.

(21) Appl. No.: 13/764,439

(22) Filed: Feb. 11, 2013

(51) Int. Cl.
*H04N 1/405* (2006.01)
*H04N 1/46* (2006.01)
*G06K 9/00* (2006.01)
*B41J 2/205* (2006.01)

(52) U.S. Cl.
CPC ...................................... *B41J 2/205* (2013.01)
USPC .......... 358/3.06; 358/534; 358/515; 358/536; 358/538; 382/162; 382/167; 382/254

(58) Field of Classification Search
USPC ............... 358/3.06, 534, 1.9, 3.02, 3.23, 515, 358/527, 533, 536, 538, 3.01, 3.04, 3.03, 358/535; 382/162, 167, 254
See application file for complete search history.

(56) References Cited

U.S. PATENT DOCUMENTS

| | | | |
|---|---|---|---|
| 3,946,398 A | 3/1976 | Kyser et al. | |
| 4,907,013 A | 3/1990 | Hubbard et al. | |
| 4,963,882 A | 10/1990 | Hickman | |
| 5,166,809 A * | 11/1992 | Surbrook | 358/1.9 |
| 5,255,085 A * | 10/1993 | Spence | 358/527 |
| 5,309,246 A * | 5/1994 | Barry et al. | 358/1.9 |
| 5,367,673 A * | 11/1994 | Goldsmith et al. | 382/167 |
| 5,581,284 A | 12/1996 | Hermanson | |
| 5,640,183 A | 6/1997 | Hackleman | |
| 6,215,557 B1 | 4/2001 | Owens | |
| 6,481,816 B1 | 11/2002 | Oyen | |
| 6,508,531 B1 | 1/2003 | Gargir | |
| 6,695,435 B1 | 2/2004 | Cheng et al. | |
| 6,739,690 B1 | 5/2004 | Darling | |
| 6,867,884 B1 * | 3/2005 | Rozzi | 358/1.9 |
| 7,199,905 B2 * | 4/2007 | Sharma | 358/3.04 |
| 7,338,144 B2 | 3/2008 | Mantell et al. | |
| 7,382,494 B2 | 6/2008 | McElvain | |
| 7,620,255 B2 | 11/2009 | Kobayashi | |
| 7,688,472 B2 | 3/2010 | McElvain | |
| 7,783,122 B2 * | 8/2010 | Wu et al. | 382/254 |
| 7,903,290 B2 | 3/2011 | Faken et al. | |
| 8,031,363 B2 * | 10/2011 | Marsden et al. | 358/1.9 |
| 8,042,899 B2 | 10/2011 | Folkins et al. | |
| 8,132,885 B2 | 3/2012 | Ramakrishnan et al. | |
| 2004/0119766 A1 | 6/2004 | Shibata et al. | |
| 2005/0105105 A1 | 5/2005 | Vestjens et al. | |
| 2005/0116981 A1 | 6/2005 | Faken et al. | |
| 2005/0190230 A1 | 9/2005 | Silverbrook et al. | |
| 2005/0225584 A1 | 10/2005 | Silverbrook et al. | |

(Continued)

*Primary Examiner* — Charlotte M Baker
(74) *Attorney, Agent, or Firm* — Maginot, Moore & Beck, LLP

(57) ABSTRACT

A method of operating a printer includes reducing a first plurality of coverage parameters in a first continuous tone (contone) pixel by a predetermined amount if a combination of at least two of the coverage parameters is below a predetermined threshold and reducing a second plurality of coverage parameters in a second pixel by a smaller amount if the combination of coverage parameters in the second pixel is greater than the predetermined threshold. The method further includes generating half-tone image data from the first and second pixels and forming printed marks corresponding to the first and second pixels on an image receiving surface.

20 Claims, 4 Drawing Sheets

(56) References Cited

U.S. PATENT DOCUMENTS

| | | |
|---|---|---|
| 2007/0115507 A1 | 5/2007 | Vladislav et al. |
| 2010/0238213 A1 | 9/2010 | Plunkett et al. |
| 2011/0012919 A1 | 1/2011 | Tai et al. |
| 2012/0075370 A1 | 3/2012 | Ramakrishnan et al. |
| 2012/0162718 A1 | 6/2012 | Klaus |

\* cited by examiner

SYSTEM AND METHOD FOR ADJUSTMENT OF COVERAGE PARAMETERS FOR DIFFERENT COLORS IN IMAGE DATA

TECHNICAL FIELD

This disclosure relates generally to printers that form color printed images on an image receiving surface and, more particularly, to printers that generate half-tone printed images from continuous tone image data.

BACKGROUND

Color half-tone printing devices deposit marking agents, such as ink or toner, having a small number of colors onto an image receiving surface to form a printed image. The marking agent is deposited in sufficiently small quantities to enable the human eye to perceive a large number of potential colors from different combinations of the marking agents. For example, many printers use cyan, magenta, yellow, and black (CMYK) marking agents to form multi-color printed images. For example, in an inkjet printer, different groups of inkjets eject CMYK inks in predetermined half-tone drop patterns to form the color images, and in a xerographic printer the CMYK toners are deposited onto a photoconductive drum or belt and are subsequently transferred to a print medium.

One type of half-tone color printer is a drop on demand inkjet printer. Drop on demand inkjet technology for producing printed media has been employed in commercial products such as printers, plotters, and facsimile machines. Generally, an inkjet image is formed by selectively ejecting ink drops from a plurality of inkjets, which are arranged in one or more printheads, onto an image receiving surface. In a direct inkjet printer, the printheads eject ink drops directly onto the surface of a print medium such as a paper sheet or a continuous paper web. In an indirect inkjet printer, the printheads eject ink drops onto the surface of an intermediate image receiving member such as a rotating imaging drum or belt. During printing, the printheads and the image receiving surface move relative to one other and the inkjets eject ink drops at appropriate times to form an ink image on the image receiving surface. A controller in the printer generates electrical signals, also known as firing signals, at predetermined times to activate individual inkjets in the printer. The ink ejected from the inkjets can be liquid ink, such as aqueous, solvent, oil based, UV curable ink or the like, which is stored in containers installed in the printer. Alternatively, some inkjet printers use phase change inks that are loaded in a solid form and delivered to a melting device. The melting device heats and melts the solid phase change ink to a liquid form that is supplied to a printhead for printing as liquid drops onto the image receiving surface.

During the operational life of these printers, inkjets in one or more printheads may become unable to eject ink or to eject ink drops of an appropriate mass in response to a firing signal. These inkjets are described as defective or inoperable inkjets in this document. When an inkjet becomes inoperable, any printed image that requires the use of the inoperable inkjet is formed with an image defect. In printer embodiments where an image receiving surface, such as a sheet or elongated roll of paper, moves past an array of printheads in a print zone, the image defect is often visible as a narrow unprinted line or "light streak" that extends through the printed image. The light streak appears in locations of the image where the inoperable inkjet would have ejected ink drops if the inoperable inkjet were functioning correctly.

Existing compensation methods enable a printer to form printed images that reduce or eliminate the visible impact of inoperable inkjets on the printed images. For example, some printers operate in a default mode where the relative coverage of the printed ink that forms printed images is set to a fraction of the maximum coverage that the printer is capable of producing. For example, a printer receives image data corresponding to a printed image and reduces the intensity of the image data by 20% to form the printed image using an 80% intensity. During operation the printer increases the intensity level for portions of the printed image that are located near an inoperable inkjet when an inoperable inkjet is detected. The increased coverage of ink around the light streak corresponding to the inoperable inkjet and the spreading of the ink on the printed paper reduces the perceptibility of the light streak. The reduced ink coverage in the default print mode provides a margin for the printer to increase the ink coverage in selected regions of the printed image to compensate for one or more inoperable inkjets.

One drawback to printing images with a reduced intensity level is that the printed quality of some colors is negatively impacted due to the reduced coverage of ink in the printed image. For example, many color printers form images using a small number of ink colors, such as CMYK inks. Different combinations of the ink colors that are printed as separate drops in close proximity to each other or that merge together in the printed image form a wide range of visible colors to the human eye. To the human eye, however, the reduced intensity of some colors in the printing process results in a much more perceptible impact to the quality of the printed image for some colors in comparison to other colors. For example, in a CMYK printer, the modified printing process affects the image quality of the color red to a greater degree than many other printed colors. In some instances, different shades of red appear to be orange due to the reduction in the intensity of the printed image. Thus, the impact on the quality of the printed images is greatly affected by the color content of the images, which can lead to reduced image quality. Consequently, improvements to the process for printing images that improve the quality of the color reproduction in the printed images would be beneficial.

SUMMARY

In one embodiment, a method of operating a printer has been developed. The method includes identifying a first plurality of coverage parameters for a first pixel of continuous tone (contone) image data, each coverage parameter corresponding to one color separation in a plurality of color separations, reducing each of the first plurality of coverage parameters by a first amount in response to a combination of at least two of the first plurality of coverage parameters being below a predetermined threshold, identifying a second plurality of coverage parameters for a second pixel of the contone image data, each coverage parameter in the second plurality of coverage parameters corresponding to one color separation in the plurality of color separations, reducing each of the second plurality of coverage parameters by a second amount, the second amount being less than the first amount, in response to a combination of the at least two of the second plurality of coverage parameters exceeding the predetermined threshold, generating half-tone image data corresponding to the first pixel and the second pixel, and operating a marking unit with reference to the half-tone image data to form marks corresponding to the first pixel and the second pixel on an image receiving surface.

In another embodiment, a printer that forms printed images with varying color intensity levels has been developed. The printer includes a marking unit configured to deposit marking agents having a plurality of colors onto an image receiving surface and a controller operatively connected to the marking unit. The controller is configured to identify a first plurality of coverage parameters for a first pixel of continuous tone (contone) image data, each coverage parameter corresponding to one color separation in a plurality of color separations, reduce each of the first plurality of coverage parameters by a first amount in response to a combination of at least two of the first plurality of coverage parameters being below a predetermined threshold, identify a second plurality of coverage parameters for a second pixel of the contone image data, each coverage parameter in the second plurality of coverage parameters corresponding to one color separation in the plurality of color separations, reduce each of the second plurality of coverage parameters by a second amount, the second amount being less than the first amount, in response to a combination of the at least two of the second plurality of coverage parameters exceeding the predetermined threshold, generate half-tone image data corresponding to the first pixel and the second pixel, and operate a marking unit with reference to the half-tone image data to form marks corresponding to the first pixel and the second pixel on an image receiving surface.

In another embodiment, a method of operating a printer has been developed. The method includes identifying a plurality of coverage parameters for a pixel of continuous tone (contone) image data, each coverage parameter in the pixel corresponding to a value in a contone plane for one of a plurality of color separations, modifying an adjustment value for the coverage parameters in the pixel in response to at least one of the identified plurality of coverage parameters for the pixel being greater than a predetermined threshold, and operating a marking unit to deposit a plurality of colorants that correspond to the plurality of color separations onto an image receiving surface with reference to the pixel in the contone plane and the modified adjustment value.

BRIEF DESCRIPTION OF THE DRAWINGS

The foregoing aspects and other features of a printer that modifies a printing process selectively for different colors in a printed image are explained in the following description, taken in connection with the accompanying drawings.

DETAILED DESCRIPTION

Figure 1:
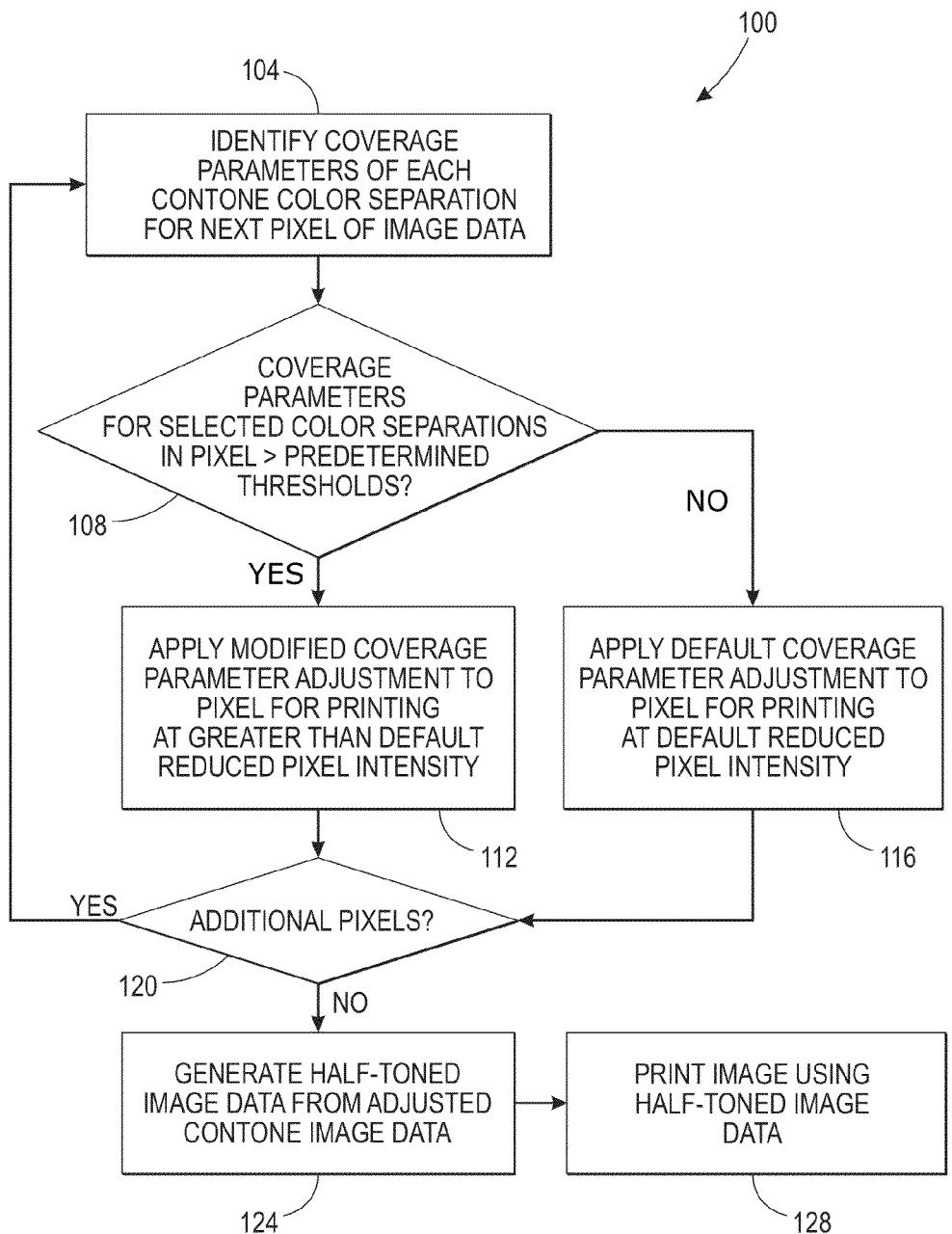
FIG. 1 is a block diagram of a process for identifying coverage parameters in pixels of continuous tone image data to modify contone pixels for selected colors differently during a printing operation.

For a general understanding of the environment for the system and method disclosed herein as well as the details for the system and method, reference is made to the drawings. In the drawings, like reference numerals have been used throughout to designate like elements. As used herein, the word "printer" encompasses any apparatus that produces images with colorants on media, such as digital copiers, bookmaking machines, facsimile machines, multi-function machines, etc.

As used herein, the term "inoperable inkjet" refers to a malfunctioning inkjet in a printer that does not eject ink drops, ejects ink drops only on an intermittent basis, or ejects ink drops onto an incorrect location of an image receiving member when the inkjet receives an electrical firing signal. A typical inkjet printer includes a plurality of inkjets in one or more printheads, and operational inkjets that are located near the inoperable inkjet can compensate for the inoperable inkjet to preserve the quality of printed images when an inkjet becomes inoperable.

As used herein, the term "pixel" refers to data that corresponds to an amount of colored ink at a location in a two-dimensional grid for an ink image to be produced in a print job. A printed image is represented by an arrangement of pixels with different colors at different locations in the image. The term "contone pixel" refers to a pixel of image data that includes one or more coverage parameter values that correspond to an intensity of a pixel in a color separation for an image. In one embodiment, a pixel includes cyan, magenta, yellow, and black color (CMYK) separations and each contone pixel includes a numeric coverage parameter for each of the CMYK separations.

As used herein, the term "continuous tone" or "contone" refers to a range of colors that can be represented by a single contone pixel in the image data. The overall color of a contone pixel is formed from the colors of the pixels in each color separation at the same position as the contone pixel that form the contone pixel. In a theoretical contone plane, the colors in the plane change continuously over an infinite number of intermediate color levels between different colors. In a digital representation of image data for a contone pixel, the different colors in the plane are represented by discrete digital values, and the number of discrete digital values is large enough to produce a range of color levels that appear to be continuous to the human eye.

The overall color of the contone pixel is typically defined in a three or four dimensional color-space. Each color separation includes a contone parameter that represents different intensity levels of the individual color separation, such as the CMYK separations. A combination of intensity values for each of the color separations produces the visible color of the contone pixel.

Figure 3:
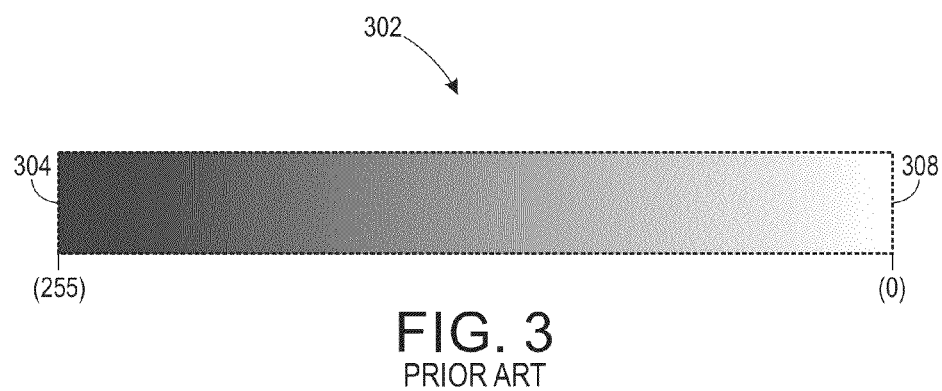
FIG. 3 is a diagram of a prior art color range corresponding to a range of coverage parameter values in a pixel.

As depicted in FIG. 3, a graph 302 depicts a range of color intensities for a single color separation from a "pure" representation of the selected color with maximum intensity that gradually decreases to zero intensity where the color is not present. In FIG. 3, the edge 304 depicts a pure hue of a color. For example, in a CMYK printer, each of the cyan, magenta, yellow, and black inks represent pure hues of the respective CMYK color separations. The color gradually lightens from the edge 304 toward the edge 308 as the intensity of the coverage parameter decreases and the white background becomes more visible. Some printer embodiments generate numeric encodings of the color intensity values in the graph 302 using 8 bits of binary data. In an 8-bit numeric representation of the coverage parameter intensity, a numeric coverage parameter value of 255 for a color separation in a pixel corresponds to the maximum intensity of the color at the edge 304, while a numeric coverage parameter of 0 corresponds to the edge 308 where the color separation reaches zero intensity. The contone pixel includes coverage parameter values that correspond to intensity values for each of the CMYK color separations.

As used herein, the terms "half-tone pixel" and "binary pixel" refer to a pixel in a single color separation, such as one of the CMYK separations, which is either activated or deactivated. An activated half-tone pixel corresponds to a location where the printer deposits a marking agent, such as ink or toner, onto an image receiving surface, while a deactivated half-tone pixel corresponds to a location where the printer does deposit the marking agent. In a CMYK printer, four sets of half-tone binary image data for each of the CMYK color separations are used to control the operation of a marking unit to form printed images. As described below, the printer generates half-tone pixels using, for example, a tone reproduction curve (TRC) to map contone coverage parameters into half-tone pixels. Half-toning processes including various forms of dithering and thresholding are used to convert contone pixels into binary image data that are used to control the operation of a marking unit to form the printed image. As used in this document, a "marking unit" refers to a device that is operated with reference to half-tone data to apply colorant to a surface to form an image.

In a CMYK printer, colors in images are formed using combinations of one or more of the cyan, magenta, yellow, and black inks in a half-tone image pattern. In the digital image data, each contone pixel includes a set of values corresponding to locations in the contone planes for each of the CMYK color separations. A digital controller in the printer or associated with the printer converts the contone image data for each pixel into two-dimensional arrangements of half-tone binary pixels that each correspond to a single color separation in a printed page. Each of the half-tone binary image is a two-dimensional array of half-tone pixels that correspond to locations on the printed page where the printer either ejects an ink drop or does not eject an ink drop to form the printed image. In a CMYK color printer, the half-tone pixels for each of the CMYK color separations control the operation of inkjets for each of the CMYK ink colors to form color images. The printer superimposes the half-tone image pixels for each of the CMYK color separations on a single printed page where the ink drops for the different colors are positioned close to one another on the printed page. To the human eye, the different combinations of the CMYK inks form a large range of perceptible colors on the printed page.

As described above, digital contone image data include parameters that describe a wide range of colors for an individual contone pixel in digital image data. In a half-tone printed image, however, the combinations of CMYK ink drops in a small region that corresponds to the size of the contone pixel are incapable of producing many of the colors that can be represented in each contone pixel. For example, many printer embodiments are configured to either print or not print a single ink drop of the CMYK colors onto a region of the image receiving surface that corresponds to the pixel. In a printer embodiment with four ink colors, and a white image receiving surface, such as paper, there are $2^4$ (16) potential combinations of ink drops on the paper, and the option to refrain from printing any ink drops to leave the paper blank. The half-toning process converts a single contone pixel into larger arrays of binary image data corresponding to each of the color separations in the contone pixel, such as the CMYK separations. The half-tone process activates some or all of the binary pixels in the arrays based on the coverage parameter value of the color separation to form the printed color with a varying level of perceived intensity even though each pixel of half-tone image data only represents a binary on/off value. As described below, the printer is configured to adjust the intensity of contone coverage parameters for selected colors to enable accurate reproduction of the selected colors when the half-tone image is printed.

Figure 4:
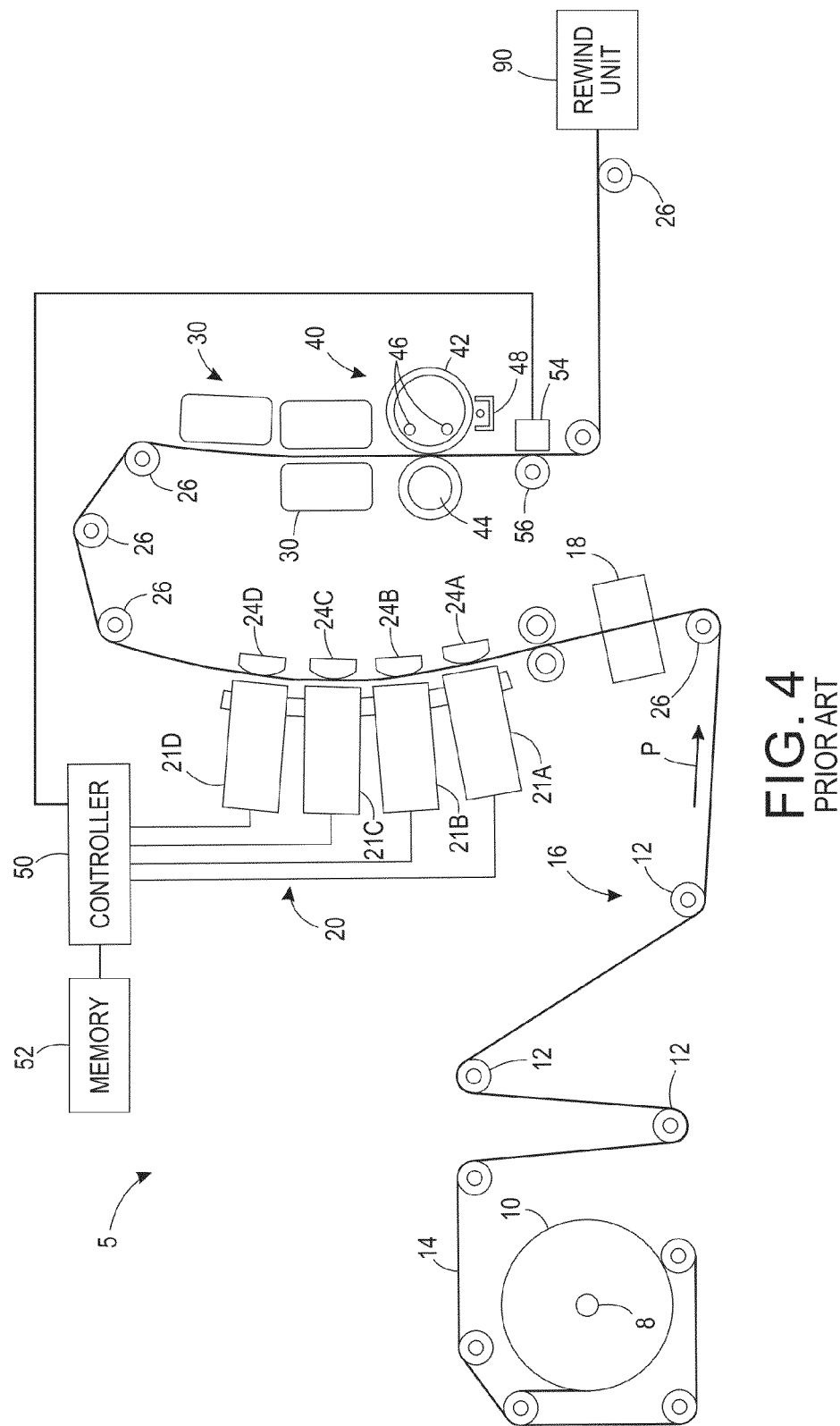
FIG. 4 is a schematic diagram of a prior art inkjet printer.

FIG. 4 depicts a prior-art inkjet printer 5. For the purposes of this document, an inkjet printer employs one or more inkjet printheads to eject drops of ink into an image receiving member, such as paper, another print medium, or an indirect member such as a rotating image drum or belt. The printer 5 is configured to print ink images with a "phase-change ink," by which is meant an ink that is substantially solid at room temperature and that transitions to a liquid state when heated to a phase change ink melting temperature for jetting onto the imaging receiving member surface. The phase change ink melting temperature is any temperature that is capable of melting solid phase change ink into liquid or molten form. In one embodiment, the phase change ink melting temperature is approximately 70° C. to 140° C. In alternative embodiments, the ink utilized in the printer comprises UV curable gel ink. Gel inks are also heated before being ejected by the inkjet ejectors of the printhead. As used herein, liquid ink refers to melted solid ink, heated gel ink, or other known forms of ink, such as aqueous inks, ink emulsions, ink suspensions, ink solutions, or the like.

The printer 5 includes a controller 50 to process the image data before generating and delivering the firing signals to the inkjet ejectors to eject colorants and form an image. Colorants can be ink, or any suitable substance that includes one or more dyes or pigments, which is applied to the selected media. The colorant can be black, or any other desired color, and some printer configurations apply a plurality of distinct colorants to the media. The media includes any of a variety of substrates, including plain paper, coated paper, glossy paper, or transparencies, among others, and the media can be available in sheets, rolls, or other physical formats.

The printer 5 is an example of a direct-to-web, continuous-media, phase-change inkjet printer that includes a media supply and handling system configured to supply a long (i.e., substantially continuous) web of media 14 of "substrate" (paper, plastic, or other printable material) from a media source, such as spool of media 10 mounted on a web roller 8. The media web 14 includes a large number (e.g. thousands or tens of thousands) of individual pages that are separated into individual sheets with commercially available finishing devices after completion of the printing process. Some webs include perforations that are formed between pages in the web to promote efficient separation of the printed pages. For simplex printing, the printer 5 passes the media web 14 through a media conditioner 16, print zone 20, and rewind unit 90 once.

The media web 14 is unwound from the source 10 as needed and a variety of motors, not shown, rotate one or more rollers 12 and 26 to propel the media web 14. The media conditioner includes rollers 12 and a pre-heater 18. The rollers 12 and 26 control the tension of the unwinding media as the media moves along a path through the printer. In alternative embodiments, the printer transports a cut sheet media through the print zone in which case the media supply and handling system includes any suitable device or structure to enable the transport of cut media sheets along a desired path through the printer. The pre-heater 18 brings the web to an initial predetermined temperature that is selected for desired image characteristics corresponding to the type of media being printed as well as the type, colors, and number of inks being used. The pre-heater 18 can use contact, radiant, conductive, or convective heat to bring the media to a target preheat temperature, which in one practical embodiment, is in a range of about 30° C. to about 70° C.

The media is transported through a print zone 20 that includes a series of printhead units 21A, 21B, 21C, and 21D, each printhead unit effectively extends across the width of the media and is able to eject ink directly (i.e., without use of an intermediate or offset member) onto the moving media. In printer 5, each of the printheads ejects a single color of ink, one for each of the colors typically used in color printing, namely the CMYK colors. The printhead units 21A-21D form a marking unit in the print zone of the printer 5 that deposits the CMYK ink drops onto the media web 14 to form half-tone color printed images. The controller 50 receives velocity data from encoders mounted proximately to rollers positioned on either side of the portion of the path opposite the four printheads to calculate the linear velocity and position of the web as the web moves past the printheads. The controller 50 uses these data to generate firing signals for actuating the inkjet ejectors in the printheads to enable the printheads to eject four colors of ink with appropriate timing and accuracy for registration of the differently colored patterns to form color images on the media. The inkjet ejectors actuated by the firing signals correspond to digital data processed by the controller 50. The digital data for the images to be printed can be transmitted to the printer, generated by a scanner (not shown) that is a component of the printer, or otherwise generated and delivered to the printer. In various configurations, a printhead unit for each primary color includes one or more printheads; multiple printheads in a single printhead unit are formed into a single row or multiple row array; printheads of a multiple row array are staggered; a printhead prints more than one color; or the printheads or portions thereof are mounted movably in a direction transverse to the process direction P for printing operations, such as for spot-color applications and the like.

Associated with each printhead unit is a backing member 24A-24D, typically in the form of a bar or roller, which is arranged substantially opposite the printhead on the back side of the media. Each backing member positions the media at a predetermined distance from the printhead opposite the backing member. The backing members 24A-24D are optionally configured to emit thermal energy to heat the media to a predetermined temperature, which is in a range of about 40° C. to about 60° C. in printer 5. The various backer members can be controlled individually or collectively. The pre-heater 18, the printheads, backing members 24A-24D (if heated), as well as the surrounding air combine to maintain the media along the portion of the path opposite the print zone 20 in a predetermined temperature range of about 40° C. to 70° C.

As the partially-imaged media web 14 moves to receive inks of various colors from the printheads of the print zone 20, the printer 5 maintains the temperature of the media web within a given range. The printheads in the printhead units 21A-21D eject ink at a temperature typically significantly higher than the temperature of the media web 14. Consequently, the ink heats the media, and temperature control devices can maintain the media web temperature within a predetermined range. For example, the air temperature and air flow rate behind and in front of the media web 14 impacts the media temperature. Accordingly, air blowers or fans can be utilized to facilitate control of the media temperature. Thus, the printer 5 maintains the temperature of the media web 14 within an appropriate range for the jetting of all inks from the printheads of the print zone 20. Temperature sensors (not shown) can be positioned along this portion of the media path to enable regulation of the media temperature.

Following the print zone 20 along the media path are one or more "mid-heaters" 30. A mid-heater 30 can use contact, radiant, conductive, and/or convective heat to control a temperature of the media. The mid-heater 30 brings the ink placed on the media to a temperature suitable for desired properties when the ink on the media is sent through the spreader 40. In one embodiment, a useful range for a target temperature for the mid-heater is about 35° C. to about 80° C. The mid-heater 30 has the effect of equalizing the ink and substrate temperatures to within about 15° C. of each other. Lower ink temperature gives less line spread while higher ink temperature causes show-through (visibility of the image from the other side of the print). The mid-heater 30 adjusts substrate and ink temperatures to 0° C. to 20° C. above the temperature of the spreader.

Following the mid-heaters 30, a fixing assembly 40 applies heat and/or pressure to the media to fix the images to the media. The fixing assembly includes any suitable device or apparatus for fixing images to the media including heated or unheated pressure rollers, radiant heaters, heat lamps, and the like. In the embodiment of the FIG. 4, the fixing assembly includes a "spreader" 40, which applies a predetermined pressure, and in some implementations, heat, to the media. The function of the spreader 40 is to flatten the individual ink droplets, strings of ink droplets, or lines of ink on web 14 and to flatten the ink with pressure and, in some systems, heat. The spreader flattens the ink drops to fill spaces between adjacent drops and form uniform images on the media web 14. In addition to spreading the ink, the spreader 40 improves fixation of the ink image to the media web 14 by increasing ink layer cohesion and/or increasing the ink-web adhesion. The spreader 40 includes rollers, such as image-side roller 42 and pressure roller 44, to apply heat and pressure to the media. Either roller can include heat elements, such as heating elements 46, to bring the web 14 to a temperature in a range from about 35° C. to about 80° C. In alternative embodiments, the fixing assembly spreads the ink using non-contact heating (without pressure) of the media after the print zone 20. Such a non-contact fixing assembly can use any suitable type of heater to heat the media to a desired temperature, such as a radiant heater, UV heating lamps, and the like.

In one practical embodiment, the roller temperature in spreader 40 is maintained at an optimum temperature that depends on the properties of the ink, such as 55° C. Generally, a lower roller temperature gives less line spread while a higher temperature produces imperfections in the gloss of the ink image. Roller temperatures that are too high may cause ink to offset to the roller. In one practical embodiment, the nip pressure is set in a range of about 500 to about 2000 psi/side. Lower nip pressure produces less line spread while higher pressure may reduce pressure roller life.

The spreader 40 can include a cleaning/oiling station 48 associated with image-side roller 42. The station 48 cleans and/or applies a layer of some release agent or other material to the roller surface. The release agent material can be an amino silicone oil having viscosity of about 10-200 centipoises. A small amount of oil transfers from the station to the media web 14, with the printer 5 transferring approximately 1-10 mg per A4 sheet-sized portion of the media web 14. In one embodiment, the mid-heater 30 and spreader 40 are combined into a single unit, with their respective functions occurring relative to the same portion of media simultaneously. In another embodiment the media is maintained at a high temperature as the media exits the print zone 20 to enable spreading of the ink.

In printer 5, the controller 50 is operatively connected to various subsystems and components to regulate and control operation of the printer 5. The controller 50 is implemented with general or specialized programmable processors that execute programmed instructions to operate one or more electronic components to perform functions or processes. The instructions and data required to perform the programmed functions are stored in a memory 52 that is associated with the controller 50. The processors, their memories, and interface circuitry configure controllers and/or a print engine to perform printer operations. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in VLSI circuits. Also, the circuits described herein can be implemented with a combination of processors, ASICs, discrete components, or VLSI circuits. In the embodiment of FIG. 4, the controller 50 receives image data for printed images in a contone data format and uses the TRC that is stored in the memory 52 to generate the halftone binary image data that are used to operate the inkjets in the printhead units 21A-21D to control the ejection of ink drops onto the media web 14.

The controller 50 is operatively connected to the printheads in the printhead units 21A-21D. The controller 50 generates electrical firing signals to operate the individual inkjets in the printhead units 21A-21D to eject ink drops that form printed images on the media web 14. The activated inkjets receive firing signals and eject ink drops at various times during the printing process. The deactivated inkjets do not receive the firing signals, and consequently do not eject ink drops during the printing process.

The printer 5 includes an optical sensor 54 that is configured to generate image data corresponding to the media web 14 and a backer roller 56. The optical sensor is configured to detect, for example, the presence, reflectance values, and/or location of ink drops jetted onto the receiving member by the inkjets of the printhead assembly. The optical sensor 54 includes an array of optical detectors mounted to a bar or other longitudinal structure that extends across the width of an imaging area on the image receiving member. In one embodiment in which the imaging area is approximately twenty inches wide in the cross-process direction and the printheads print at a resolution of 600 dpi in the cross-process direction, over 12,000 optical detectors are arrayed in a single row along the bar to generate a single scanline of image data corresponding to a line across the image receiving member. The optical detectors are configured in association with one or more light sources that direct light towards the surface of the image receiving member. The optical detectors receive the light generated by the light sources after the light is reflected from the image receiving member. The magnitude of the electrical signal generated by an optical detector in response to light being reflected by the bare surface of the media web 14, markings formed on the media web 14, and portions of a backer roller support member 56 that are exposed to the optical sensor 54. The magnitudes of the electrical signals generated by the optical detectors are converted to digital values by an appropriate analog/digital converter.

During operation, the controller 50 receives contone image data, which typically includes a plurality of image data pixels with color separations, such as red, green, blue (RGB) or CMYK separation values, which correspond to contone planes for the color separations. In one embodiment, each contone pixel includes an 8-bit numeric parameter corresponding to the relative coverage parameter for each of the color separations in the pixel. The minimum value (0) indicating zero coverage in the color separation and the maximum value (255) indicates full coverage of the color at 100% saturation. Intermediate values correspond to different levels of coverage between zero and full coverage. Since the inkjet printer 5 ejects ink drops in a half-tone print mode, the controller 50 maps the coverage parameters in the contone image data to a predetermined TRC that is stored in the memory 52. The controller 50 uses the TRC to translate the contone coverage parameter values into a series of binary pixels that correspond to locations on the media web 14 where the inkjets in the printhead units 21A-21D either eject ink drops or do not eject ink drops to form a half-tone printed image. The TRC is used as part of a dithering process that enables the printer 5 to reproduce a large number of perceptible colors using a small number of inks, such as the CMYK inks. The TRC accounts for the physical properties of the printed ink drops, including the propensity of the ink drops to spread on the surface of the media web 14, to enable generation of half-tone printed images that accurately reproduce the contone image. The use of TRCs for the conversion of contone image data to half-tone image data is well known in the art and is not explained in greater detail herein.

In some operating modes, such as when an inoperable inkjet is detected, the controller 50 reduces the contone coverage parameters for the color separation values in each pixel to re-map the contone pixels to different locations on the corresponding TRC for each color separation. For example, if the coverage parameter for cyan in a contone pixel has a value of 240, the controller 50 reduces the value by a predetermined amount, such as an offset of −15, to a re-mapped value of 225. The reduced coverage parameter value of the contone pixel corresponds to a different location on the TRC.

As described above, the controller 50 reduces the contone coverage parameters for most of the contone pixels in the image to lighten the image in a selected print modes. If the controller 50 identifies an inoperable inkjet, then the controller 50 increases the coverage parameter values for contone pixels corresponding to inkjets that are near the inoperable inkjet to compensate for the inoperable inkjet. Some inoperable inkjet compensation processes also generate additional halftone pixels for the nearby operational inkjets to increase the coverage around the inoperable inkjet. The increased ink coverage in the region surrounding the inoperable inkjet reduces the visual perceptibility of the light streak.

During the print modes where the contone image data for pixels are adjusted so they map to different locations on the TRC, the reduced coverage parameters can have a disproportionate impact on the perceived image quality of some colors. For example, in the CMYK printer 5, different shades of red are reproduced using combinations of the magenta and yellow inks. The reduction of the magenta and yellow coverage parameters in the contone image data can result in the printed color appearing to be orange instead of a slightly lighter shade of red. Many other colors, however, do not suffer from the loss in image quality in the reduced coverage print mode. As described below, the controller 50 is configured to identify combinations of coverage parameter values in two or more color separations in the contone image data and modify the reduction in the coverage parameters to improve the image quality for selected colors in the printed document.

While the printer 5 described above is an embodiment of an inkjet printer, the printing processes described herein are also suitable for use with other half-tone printer embodiments including, but not limited to, xerographic printers. For example, in a xerographic printer the contone image data are adjusted to lighten the contone pixels that form the image, but the contone image data for pixels that correspond to the predetermined colors are either adjusted by a smaller amount or not adjusted to preserve the image quality of the selected colors in the printed image. A marking unit in the xerographic printer deposits CYMK toners onto a photoconductive drum or belt in locations corresponding to the half-tone pixels in each of the color separations.

FIG. 1 depicts a process 100 that adjusts the contone image data for different pixels in contone image data to reduce the negative impact of the re-mapping selected pixel colors to different locations on the TRC in the image. In the description below, a reference to the process 100 performing or doing some function or action refers to one or more controllers or processors that are configured with programmed instructions, which are executed by the controllers or processors to implement the process performing the function or action or operating one or more components to perform the function or action. Some embodiments of process 100 adjust the coverage parameters of each contone pixel in the image data. In other embodiments, the printer omits contone pixels that are located near image data corresponding to an inoperable inkjet to enable compensation for the inoperable inkjet. Process 100 is described with reference to the printer 5 of FIG. 4 for illustrative purposes.

Process 100 begins with identification of coverage parameters for each of the color separations in the contone planes for a contone pixel in image data (block 104). For example, in some embodiments each contone pixel of image data includes 8-bit numeric values in a range of 0 to 255 that correspond to the amount of a color in each of the color separations used in the printer. In some embodiments, the contone CMYK data are generated from an image input that is encoded using a different set of colors, such as red, green, and blue (RGB) colors, and the controller 50 identifies the CMYK coverage parameters using a conversion process that is known to the art. In the CMYK printer 5, the controller 50 receives 32 bits of digital data corresponding to a contone pixel, with the 32-bit value including 8-bit numeric values corresponding to the amount of cyan, magenta, yellow, and black colors that form the contone pixel.

The overall color of the contone pixel is a combination of the different CMYK colors at different coverage levels. In the embodiment described above where each color separation has an 8-bit coverage parameter, a coverage parameter value of 0 indicates that the color separation is not used to form the pixel color, and a value of 255 indicates that the maximum intensity of the color separation is used to form the contone pixel. Intermediate values indicate that varying levels of the color separation are used to form the contone pixel. In another embodiment, the numeric values are expressed as a percentage value between 0% for minimum coverage and 100% for maximum coverage, and alternative embodiments include other appropriate numeric scales to express the coverage parameter. The print medium is white paper in many common configurations, which results in a white (blank) pixel when all four of the CMYK color separations have a value of 0. As depicted in FIG. 3, the numeric value for each color separation corresponds to a location along the line 316 between white at corner 312 (zero coverage) and the pure ink color at corner 304 (maximum coverage).

Referring again to FIG. 1, process 100 identifies if the coverage parameter values for one or more color separations in the contone pixel exceed a predetermined threshold that corresponds to one or more contone pixel colors (block 108). In one embodiment of process 100, the predetermined thresholds are selected to identify printed colors that are most susceptible to perceptible image quality degradation when the image is printed due to the coverage parameter adjustment process. For example, in some printer configurations colors with a red-shade suffer a disproportionate degradation in image quality due to the coverage parameter adjustment process. The red colors include large magenta and yellow coverage parameters. In the printer 5, the memory 52 stores one or more predetermined threshold values for both the magenta and yellow parameters individually and a sum of the two parameters. For example, the memory 52 stores a minimum threshold value of 60% for each of the magenta and yellow parameters and a combined threshold value of 125% for the sum of the magenta and yellow parameters. The controller 50 identifies whether the coverage parameters in the contone pixel for the magenta and yellow color separations both exceed the individual threshold values of 60% and whether the sum of the two coverage parameters exceeds the combined threshold of 125%. For example, a pixel with coverage parameters of 85% magenta and 55% yellow exceeds the total threshold, but does not exceed the threshold for yellow, while a pixel with coverage parameters of 65% magenta and 65% yellow exceeds the individual and combined thresholds for magenta and yellow. In an alternative embodiment, the controller 50 only uses the combined threshold value to identify whether the color of the contone pixel corresponds to one of the predetermined colors, such as red, that receive a modified coverage parameter adjustment setting. The threshold values can include thresholds for each color separation and combination of color separations that are used in the printer.

While shades of red are provided as an example of colors that receive a modified coverage parameter adjustment operation, the printer 5 can be configured to perform a modified coverage parameter adjustment operation for other colors as well. In one configuration, the predetermined colors are selected as part of a print job to adjust the coverage parameter adjustment operation that is applied to particular colors. For example, if a print job includes a printed logo with one or more colors that should be reproduced accurately, then the memory 52 stores threshold values that correspond to the colors of the logo, which are either received with the contone pixel data for the print job or are stored in the memory 52 through a graphical user interface (GUI) or other control interface with the printer 5.

If the identified coverage parameters exceed the predetermined thresholds for the contone pixel (block 108), then the controller applies a modified coverage parameter adjustment process to the coverage parameters in the contone pixel (block 112). The modified coverage parameter adjustment process reduces the coverage parameters in the contone pixel by a smaller amount than a default adjustment value if the combined coverage parameters for the selected color separations exceed the predetermined threshold. In some embodiments, the modification of the coverage parameter adjustment process corresponds to the degree to which the combined coverage parameters for the selected color separations in the contone pixel exceed the predetermined threshold. In some embodiments, the controller 50 does not reduce the coverage parameters for a pixel that exceeds the predetermined threshold.

Figure 2:
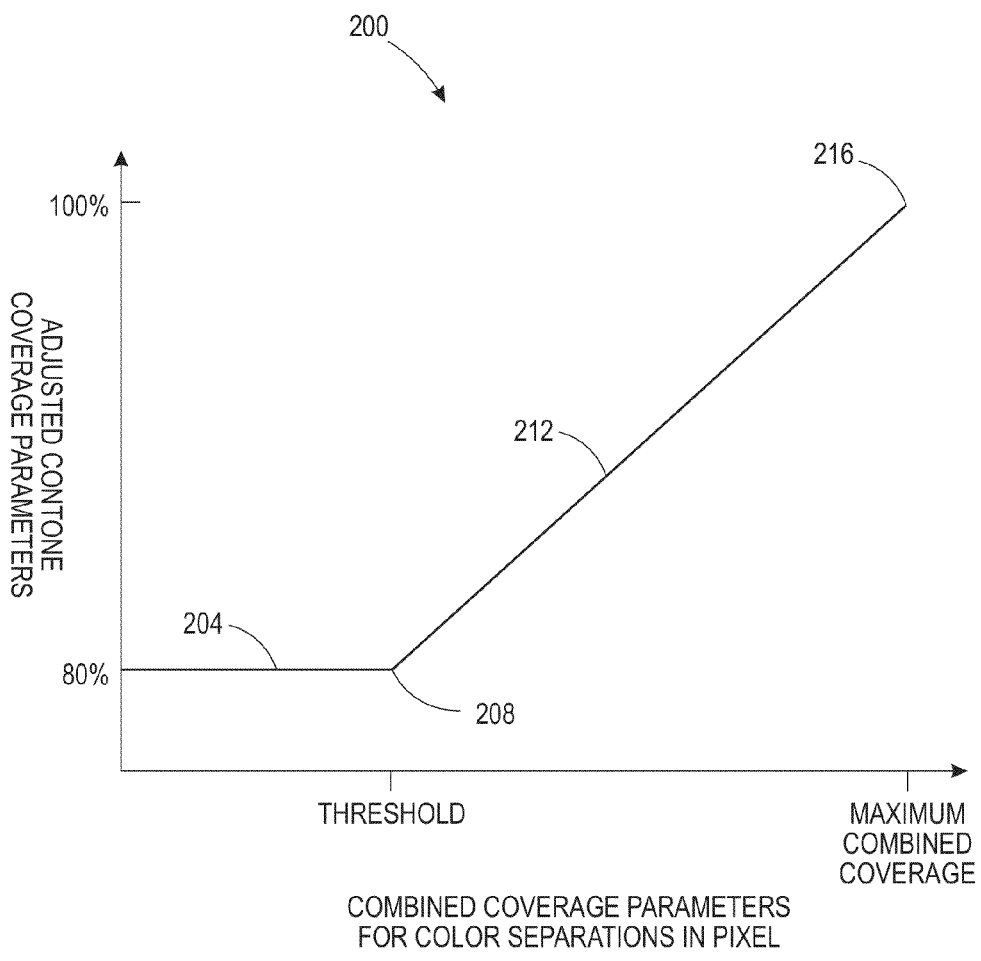
FIG. 2 is a graph depicting adjustment to coverage parameters in contone pixels based on identified coverage parameters for two or more color separations in the contone pixel.

FIG. 2 is a graph 200 that depicts one embodiment of a coverage parameter adjustment modification function. In the graph 200, the region 204 represents pixels with combined coverage parameters that are below the predetermined threshold. The pixels in segment 204 that have a combined coverage parameter value below the threshold or that have at least one color separation pixel with a coverage parameter that is below the predetermined threshold for the individual color separation receive the default coverage parameter adjustment, which is set at 80% in the example of FIG. 2. In FIG. 2, the coverage parameter adjustment reduces the default coverage parameters in a contone pixel by 20% for any contone pixel that does not include combined coverage parameters that exceed the predetermined threshold for the selected color.

If the coverage parameters for the contone pixel exceed the predetermined threshold, then the printer reduces the coverage parameters for the contone pixel by a smaller amount, and in some pixels the printer retains the original coverage parameter values of the contone pixel. In FIG. 2, the line segment 212 depicts the relative coverage parameter percentage in the contone pixels having a combined coverage parameter value that exceeds the threshold 208. In FIG. 2, the percentage density for the coverage parameters in the contone pixels are reduced by smaller amounts in comparison to the original density of the contone pixels with the adjusted coverage parameters increasing linearly in proportion to the amount that the combined coverage parameters exceed the threshold 208. In the graph 200, the contone coverage parameter density reaches 100% for pixels that include a maximum combined coverage parameter value for each of the color separations at reference 216. For example, using the example of red colors described above, the coverage parameter adjustment process does not adjust the contone coverage parameters for a contone pixel that includes maximum coverage parameter values for the magenta and yellow color separations. FIG. 2 is an illustrative example of a linear relationship for modifying the coverage parameter adjustment, but alternative embodiments include non-linear relationships, such as logarithmic functions. In another embodiment, a predetermined coverage parameter adjustment modification is applied to any pixel that exceeds the predetermined threshold, such as increasing the relative percentage density of any contone pixels that exceed the threshold to 100% of the original coverage parameters in the contone pixels or to another level that is greater than the default coverage parameter adjustment.

Referring again to FIG. 1, if the identified coverage parameters do not exceed the predetermined thresholds for the pixel (block 108), then the controller applies a default adjustment process to reduce the coverage parameter values of the pixel by a predetermined amount (block 116). Using the example provided above, the controller 50 reduces the value of each coverage parameter by 20%. In another embodiment, the numeric values for each coverage parameter are reduced by a predetermined amount, such as reducing each coverage parameter value in a range of 0-255 by 10. In some embodiments the coverage parameters are not reduced below a minimum value to prevent the printer from completely deactivating a contone pixel in the image data.

Referring again to FIG. 1, process 100 continues for additional contone pixels in the image data (block 120). Process 100 continues in an iterative manner until the coverage parameters for each of the contone pixels in the image have been processed. Once all of the contone image pixels have been processed (block 120), the printer 5 generates half-tone image data for each of the modified contone pixels (block 124). In the printer 5, the controller 50 uses the TRC stored in the memory 52 to generate half-tone pixels in the CMYK color separations using the modified contone pixels of image data as inputs to the half-tone process. The controller 50 uses the half-tone image data pixels to control the operation of the inkjets in the printhead units 21A-21D to form the printed image corresponding to the contone pixels on the media web 14 (block 128). As described above, the reduced coverage parameters in the contone image data result in a reduced density of printed ink drops reduces the visibility of light streaks from inoperable inkjets in an inkjet printer. In inkjet and xerographic printers, the reduced density also reduces marking agent consumption in selected print modes. The predetermined contone colors, such as red, are formed with an increased density to increase the image quality.

It will be appreciated that various of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method of operating a printer comprising:
   identifying a first plurality of coverage parameters for a first pixel of continuous tone (contone) image data, each coverage parameter corresponding to one color separation in a plurality of color separations;
   reducing each of the first plurality of coverage parameters by a first amount in response to a combination of at least two of the first plurality of coverage parameters being below a predetermined threshold;
   identifying a second plurality of coverage parameters for a second pixel of the contone image data, each coverage parameter in the second plurality of coverage parameters corresponding to one color separation in the plurality of color separations;
   reducing each of the second plurality of coverage parameters by a second amount, the second amount being less than the first amount, in response to a combination of the at least two of the second plurality of coverage parameters exceeding the predetermined threshold;
   generating half-tone image data corresponding to the first pixel and the second pixel; and
   operating a marking unit with reference to the half-tone image data to form marks corresponding to the first pixel and the second pixel on an image receiving surface.

2. The method of claim 1 wherein the second amount of reduction is zero.

3. The method of claim 1 further comprising:
   identifying an amount by which the combination of the at least two coverage parameters in the second pixel exceeds the predetermined threshold; and
   identifying the second amount of reduction for the coverage parameters of the second pixel with reference to the amount by which the combination of the at least two coverage parameters exceeds the predetermined threshold.

4. The method of claim 2, the identification of the second amount of reduction further comprising:
   identifying that the second amount of reduction for the coverage parameters of the second pixel is zero in response to the at least two coverage parameters in the pixel having maximum coverage parameter values.

5. The method of claim 3 further comprising:
   identifying the second amount of reduction with reference to a relationship between the amount by which the combination of the at least two coverage parameters in the second pixel exceeds the predetermined threshold, the first amount of reduction, and a predetermined minimum amount of reduction for the coverage parameters.

6. The method of claim 5 wherein the relationship is a linear function.

7. The method of claim 5 wherein the relationship is a logarithmic function.

8. The method of claim 1 wherein the first amount of reduction is 20% of each of the coverage parameters in the first pixel.

9. A printer comprising:
a marking unit configured to deposit marking agents having a plurality of colors onto an image receiving surface; and
a controller operatively connected to the marking unit, the controller being configured to:
  identify a first plurality of coverage parameters for a first pixel of continuous tone (contone) image data, each coverage parameter corresponding to one color separation in a plurality of color separations;
  reduce each of the first plurality of coverage parameters by a first amount in response to a combination of at least two of the first plurality of coverage parameters being below a predetermined threshold;
  identify a second plurality of coverage parameters for a second pixel of the contone image data, each coverage parameter in the second plurality of coverage parameters corresponding to one color separation in the plurality of color separations;
  reduce each of the second plurality of coverage parameters by a second amount, the second amount being less than the first amount, in response to a combination of the at least two of the second plurality of coverage parameters exceeding the predetermined threshold;
  generate half-tone image data corresponding to the first pixel and the second pixel; and
  operate a marking unit with reference to the half-tone image data to form marks corresponding to the first pixel and the second pixel on an image receiving surface.

10. The printer of claim 9 wherein the second amount of reduction is zero.

11. The printer of claim 9, the controller being further configured to:
  identify an amount by which the combination of the at least two coverage parameters in the second pixel exceeds the predetermined threshold; and
  identify the second amount of reduction for the coverage parameters of the second pixel with reference to the amount by which the combination of the at least two coverage parameters exceeds the predetermined threshold.

12. The printer of claim 11, the controller being further configured to:
  identify that the second amount of reduction for the coverage parameters of the second pixel is zero in response to the at least two coverage parameters in the pixel having maximum coverage parameter values.

13. The printer of claim 11, the controller being further configured to:
  identify the second amount of reduction with reference to a relationship between the amount by which the combination of the at least two coverage parameters in the second pixel exceeds the predetermined threshold, the first amount of reduction, and a predetermined minimum amount of reduction for the coverage parameters.

14. The printer of claim 13 wherein the relationship is a linear function.

15. The printer of claim 13 wherein the relationship is a logarithmic function.

16. The printer of claim 9 wherein the first amount of reduction is 20% of each of the coverage parameters in the first pixel.

17. A method of operating a printer comprising:
  identifying a plurality of coverage parameters for a pixel of continuous tone (contone) image data, each coverage parameter in the pixel corresponding to a value in a contone plane for one of a plurality of color separations;
  modifying an adjustment value for the coverage parameters in the pixel in response to at least one of the identified plurality of coverage parameters for the pixel being greater than a predetermined threshold; and
  operating a marking unit to deposit a plurality of colorants that correspond to the plurality of color separations onto an image receiving surface with reference to the pixel in the contone plane and the modified adjustment value.

18. The method of claim 17 further comprising:
  identifying a sum of at least two of the coverage parameters for the pixel; and
  modifying the adjustment value in response to the sum of the at least two coverage parameters exceeding the predetermined threshold.

19. The method of claim 18 wherein the color separations corresponding to the at least two coverage parameters are a yellow color separation and a magenta color separation.

20. The method of claim 18, the modification of the adjustment value further comprising:
  identifying a difference between a sum of the at least two coverage parameters for the pixel and the predetermined threshold; and
  modifying the adjustment value to be between a first adjustment value and a second adjustment value with reference to the identified difference, the second adjustment value being greater than the first adjustment value.

* * * * *